(12) United States Patent
Behjati Najafabadi

(10) Patent No.: US 12,401,302 B2
(45) Date of Patent: Aug. 26, 2025

(54) ADAPTIVE MOTOR CONTROLLER

(71) Applicant: Infineon Technologies Austria AG, Villach (AT)

(72) Inventor: Hamid Behjati Najafabadi, Los Angeles, CA (US)

(73) Assignee: Infineon Technologies Austria AG, Villach (AT)

( * ) Notice: Subject to any disclaimer, the term of this patent is extended or adjusted under 35 U.S.C. 154(b) by 166 days.

(21) Appl. No.: 18/468,139

(22) Filed: Sep. 15, 2023

(65) Prior Publication Data

US 2025/0096711 A1    Mar. 20, 2025

(51) Int. Cl.
*H02P 21/26* (2016.01)
*H02P 21/20* (2016.01)
*H02P 21/22* (2016.01)
*H02P 21/28* (2016.01)

(52) U.S. Cl.
CPC .............. *H02P 21/26* (2016.02); *H02P 21/20* (2016.02); *H02P 21/22* (2016.02); *H02P 21/28* (2016.02)

(58) Field of Classification Search
CPC .......... H02P 21/26; H02P 21/20; H02P 21/22; H02P 21/28; H02P 6/182; H02P 21/13; H02P 21/18; H02P 21/24
USPC ................................................... 318/400.02
See application file for complete search history.

(56) References Cited

U.S. PATENT DOCUMENTS

| | | | |
|---|---|---|---|
| 7,026,772 B2 | 4/2006 | Quirion | |
| 7,586,282 B2 | 9/2009 | Takahashi et al. | |
| 7,652,441 B2 * | 1/2010 | Ying Yin Ho | H02P 21/16 318/431 |
| 9,106,177 B2 | 8/2015 | Son et al. | |
| 9,479,099 B2 | 10/2016 | Zhao et al. | |
| 9,742,322 B2 | 8/2017 | Rethinam et al. | |
| 10,056,857 B2 | 8/2018 | Zhao et al. | |
| 10,830,610 B2 | 11/2020 | Murray et al. | |
| 2014/0210386 A1 | 7/2014 | Zhao et al. | |
| 2014/0333241 A1 | 11/2014 | Zhao et al. | |
| 2016/0056744 A1 | 2/2016 | Khan et al. | |
| 2022/0094285 A1 | 3/2022 | Zhao | |

FOREIGN PATENT DOCUMENTS

| | | |
|---|---|---|
| EP | 3829050 A1 | 6/2021 |
| EP | 3849073 A1 | 7/2021 |

* cited by examiner

*Primary Examiner* — David Luo
(74) *Attorney, Agent, or Firm* — Murphy, Bilak & Homiller, PLLC

(57) ABSTRACT

A controller for a permanent magnet synchronous motor includes a first control loop having a first filter. The first filter has a back-EMF voltage vector input, a magnetic flux vector output with a constant phase shift that is independent of motor speed, and an amplitude response that is inversely proportional to rotor electrical frequency. The first control loop is configured to: generate an adjusted magnetic flux vector from the magnetic flux vector output by the first filter and compensate for the constant phase shift introduced by the first filter; estimate the rotor electrical frequency from the adjusted magnetic flux vector; and feedback a filtered version of the rotor electrical frequency estimate to the first filter as an estimation of the rotor electrical frequency.

21 Claims, 10 Drawing Sheets

ADAPTIVE MOTOR CONTROLLER

BACKGROUND

FOC (field oriented control) is highly desired in motor control applications because of advantageous characteristics such as improved performance especially for PMSM (permanent magnet synchronous motor) applications. PMSM applications include two motor types: SPM (surface permanent magnet) and IPM (interior permanent magnet) motors.

Observers, on the other hand, are control loops that are designed to estimate or 'observe' internal variables of the system without directly measuring the variables. For example, a position observer estimates the rotor angular position without using an actual position sensor.

Sensorless observers, which estimate rotor angular position and motor speed, are highly desired and are usually implemented together with FOC. Some advantages of sensorless observers include cost reduction by eliminating the position sensor, increased system reliability because the sensor can fail, and increases maximum operating temperature of the motor since position sensors are mounted on the motor and usually cannot operate at high temperatures. Another type of observer that is used in certain FOC controllers is a flux observer which estimates stator flux without using flux sensors.

There are two major FOC methods for PMSMs, namely SFO (stator frame orientation) controllers and RFO (rotor frame orientation) controllers. For sensorless control in RFO, a rotor position observer is required. For sensorless control in SFO, a rotor position observer and a stator flux observer are needed.

Conventional sensorless observers cannot achieve zero-phase-shift at all speeds. Non-zero phase-shift in an estimated position means the motor is not operating at MTPA (maximum torque per amp) which means less than optimal efficiency. Efficiency is particularly critical for battery power applications, where minimizing unnecessary losses is of utmost importance to maximize battery run time. Also, conventional sensorless observers are not adaptive which means the observer does not adapt based on the operating condition of the PMSM.

Conventional sensorless observers are not universal in that conventional sensorless observers are unable to support both PMSM types, namely SPM (surface permanent magnet) and IPM (interior permanent magnet) motors and at the same time support both FOC (field oriented control) methods, namely RFO (rotor frame orientation) control and SFO (stator frame orientation) control. Most conventional sensorless observers only work for SPM-type motors and not IPM-type motors. Most conventional sensorless observers work for RFO control type. No single conventional sensorless observer works for both IPM and SPM while also supporting both SFO and RFO control types at the same time.

Thus, there is a need for improved sensorless observer methodology.

SUMMARY

According to an embodiment of a controller for a permanent magnet synchronous motor, the controller comprises: a first control loop comprising a first filter, wherein the first filter has a back-EMF voltage vector input, a magnetic flux vector output with a constant phase shift that is independent of motor speed, and an amplitude response that is inversely proportional to rotor electrical frequency, wherein the first control loop is configured to: generate an adjusted magnetic flux vector from the magnetic flux vector output by the first filter and compensate for the constant phase shift introduced by the first filter; estimate the rotor electrical frequency from the adjusted magnetic flux vector; and feedback a filtered version of the rotor electrical frequency estimate to the first filter as an estimation of the rotor electrical frequency.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Described herein are embodiments of a zero-phase-shift observer (control loop) that is universal in that both SPM and IPM motor types and both RFO and SFO control methods are supported. The zero-phase-shift observer also is adaptive in that control parameters are not constant and instead adapt to changes in the operating point and speed of the motor. The zero-phase-shift observer enables zero-phase-shift at all speeds, ensuring the motor operates at the MTPA condition which is important for battery powered applications where minimizing unnecessary losses is of utmost importance to maximize battery run time. The zero-phase-shift observer has the ability to observe both rotor position (for RFO and SFO) and stator flux (for SFO).

Described next, with reference to the figures, are exemplary embodiments of the zero-phase-shift observer (control loop).

Figure 1:
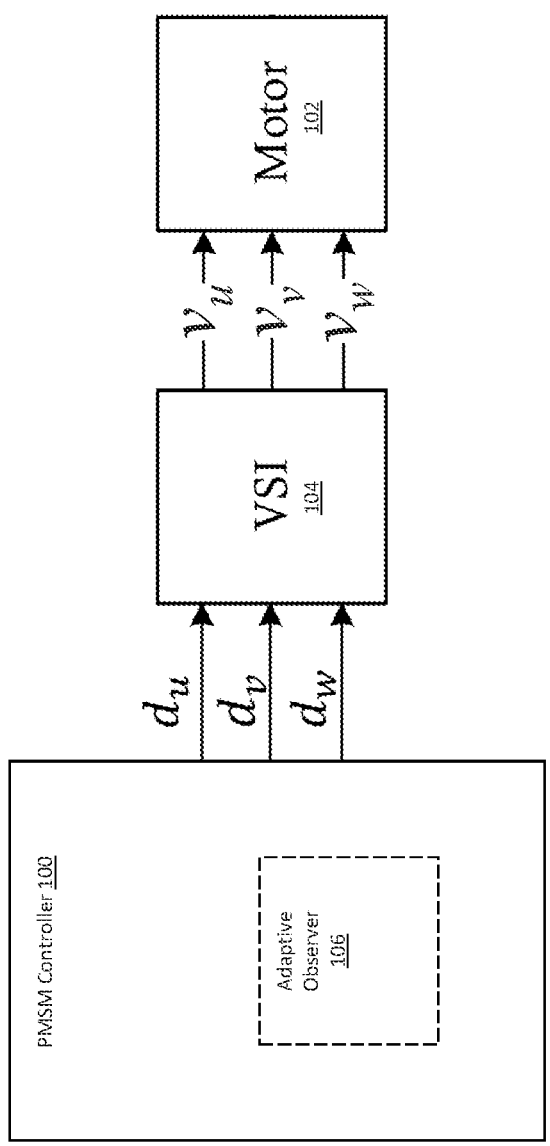
FIG. 1 illustrates a schematic diagram of an adaptive motor controller.

FIG. 1 illustrates a block diagram of a controller 100 for a PMSM 102. The controller 100 generates a command duty cycle 'd' for each phase of the PMSM 102. In FIG. 1, the PMSM 102 is depicted as having three phases: u, v, and w. More generally, the PMSM 102 can have two of more phases. A voltage source inverter (VSI) 104 translates each phase command generated by the controller 100 into a corresponding motor phase voltage $v_n$.

The controller 100 includes a zero-phase-shift observer (control loop) 106 having a first filter H(s). The first filter H(s) has a back-EMF voltage vector input $e_{\alpha\beta}(\theta_r)$, a magnetic flux vector output $\lambda_{\alpha\beta}(\theta_r+\theta'_p)$ with a constant phase shift $\theta_p'$ that is independent of motor speed, and an amplitude response $$\frac{1}{|\omega_r|}$$

that is inversely proportional to rotor electrical frequency $\omega_r$. The zero-phase-shift observer (control loop) 106 generates an adjusted magnetic flux vector $\lambda'_{\alpha\beta}(\theta_r+\theta'_p)$ from the magnetic flux vector output $\lambda_{\alpha\beta}(\theta_r+\theta'_p)$ of the first filter H(s) to be able to extract the rotor angle, and compensates for the constant phase shift $\theta'_p$ introduced by the first filter H(s). The zero-phase-shift observer (control loop) 106 estimates the rotor electrical frequency $\hat{\omega}_r$ from the adjusted magnetic flux vector $\lambda'_{\alpha\beta}(\theta_r+\theta'_p)$. The phase-shift observer (control loop) 106 feeds back a filtered version of the rotor electrical frequency estimate $|\hat{\omega}_{r,filt}|$ to the first filter H(s).

Before describing the zero-phase-shift observer (control loop) 106 in more detail, some mathematical conventions are explained next.

In general, three-phase variables (u, v, w) such as voltages, currents, fluxes, etc. can be expressed using a vector representation as follows.

$$x_{uvw} = \begin{bmatrix} x_u \\ x_v \\ x_w \end{bmatrix} \tag{1}$$

The same vector definition can be used for the corresponding SRF (stationary-reference-frame) α, β, 0 and RRF (rotating-reference-frame) q, d, 0 representation of such variables, as follows:

$$x_{\alpha\beta 0} = \begin{bmatrix} x_\alpha \\ x_\beta \\ x_0 \end{bmatrix} \tag{2}$$

$$x_{qd0} = \begin{bmatrix} x_q \\ x_d \\ x_0 \end{bmatrix} \tag{3}$$

The transformation from three-phase to SRF can be done using the following matrix (also known as Clarke transformation matrix):

$$x_{\alpha\beta 0} = K(0)x_{uvw} \tag{4}$$

$$K(0) = \frac{2}{3}\begin{bmatrix} 1 & \cos(-\alpha) & \cos(\alpha) \\ 0 & \sin(-\alpha) & \sin(\alpha) \\ 1/2 & 1/2 & 1/2 \end{bmatrix}, \alpha = \frac{2\pi}{3} \tag{5}$$

The transformation from SRF to RRF can be done using the following rotation matrix (also known as Park transformation matrix):

$$R(\theta) = \begin{bmatrix} \cos(\theta) & -\sin(\theta) & 0 \\ \sin(\theta) & \cos(\theta) & 0 \\ 0 & 0 & 1 \end{bmatrix} \tag{6}$$

It should be noted that the Park transform has certain properties that will be used later herein, namely:

$$R^{-1}(\theta) = R(-\theta) = R^T(\theta) = \begin{bmatrix} \cos(\theta) & \sin(\theta) & 0 \\ -\sin(\theta) & \cos(\theta) & 0 \\ 0 & 0 & 1 \end{bmatrix} \tag{7}$$

and $$R(\theta_1 + \theta_2) = R(\theta_1)R(\theta_2) = R(\theta_2)R(\theta_1) \tag{8}$$

The Park and Clarke transformation matrices can be combined to go directly from three-phase to RRF as follows:

$$x_{qd0} = R(\theta)x_{\alpha\beta 0} = \underbrace{R(\theta)K(0)}_{K(\theta)}x_{uvw} \tag{9}$$

where $$K(\theta) = \frac{2}{3}\begin{bmatrix} \cos(\theta) & \cos(\theta - \alpha) & \cos(\theta + \alpha) \\ \sin(\theta) & \sin(\theta - \alpha) & \sin(\theta + \alpha) \\ 1/2 & 1/2 & 1/2 \end{bmatrix} \tag{10}$$

Motor windings are either star connected with no ground return or delta connected. Therefore, the zero component of the currents and voltages are always zero and the vector representations can be simplified by removing the zero component as follows:

$$x_{\alpha\beta} = \begin{bmatrix} x_\alpha \\ x_\beta \end{bmatrix} \tag{11}$$

With these mathematical conventions in mind, the zero-phase-shift observer (control loop) 106 is described next in more detail in the context of the RFO control method.

Figure 2:
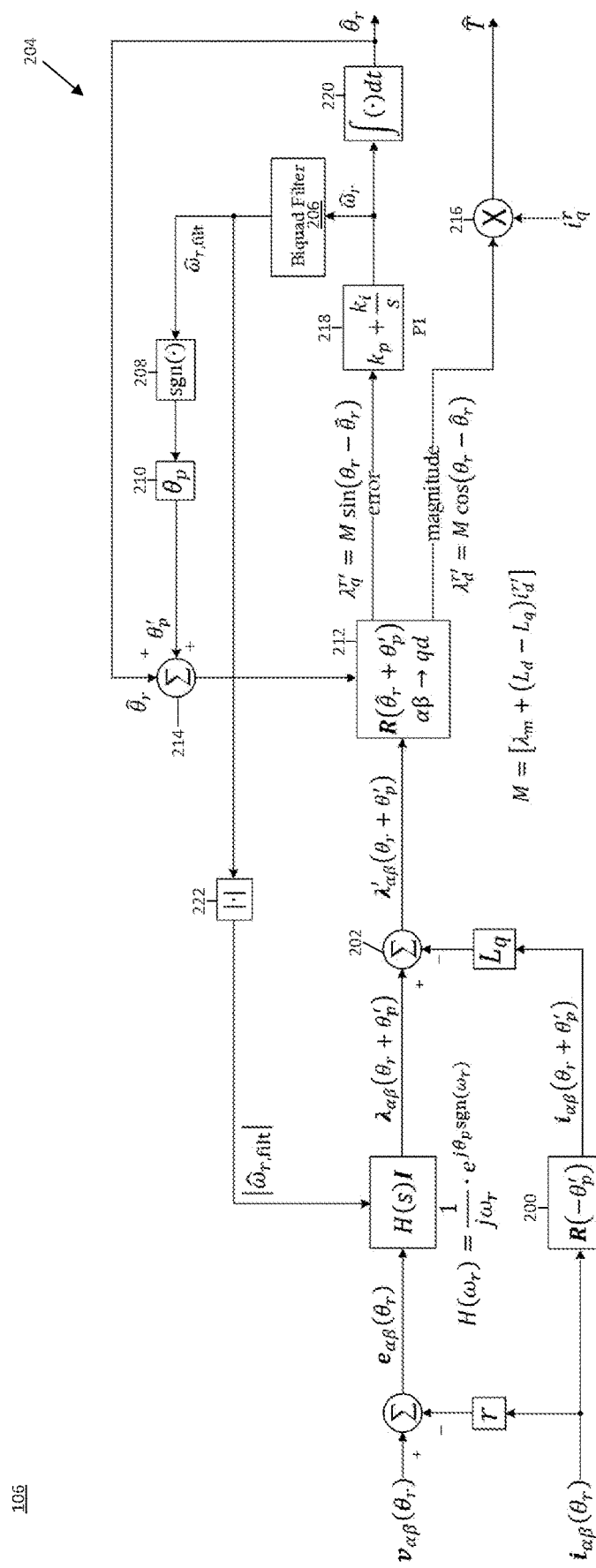
FIG. 2 illustrates a schematic diagram of a zero-phase-shift observer (control loop) included in the adaptive motor controller, in RFO (rotor frame orientation) control.

FIG. 2 illustrates a block diagram of the zero-phase-shift observer (control loop) 106 in RFO control. In FIG. 2, the zero-phase-shift observer (control loop) 106 generates the back-EMF voltage vector $e_{\alpha\beta}(\theta_r)$ from an applied motor voltage vector $v_{\alpha\beta}(\theta_r)$ and an applied motor current vector $i_{\alpha\beta}(\theta_r)$ in SRF (stationary reference frame). The motor back-EMF voltages, which are derivatives of the stator fluxes, can be expressed in terms of the applied inverter voltages and currents in SRF as follows:

$$e_{\alpha\beta}(\theta_r) = \frac{d\lambda_{\alpha\beta}(\theta_r)}{dt} = v_{\alpha\beta}(\theta_r) - ri_{\alpha\beta}(\theta_r) \tag{12}$$

The back-EMF voltage vector $e_{\alpha\beta}(\theta_r)$ is then fed to the first filter H(s), which is modeled as a transfer function H(s)I in FIG. 2. Without loss of generality, the transfer function H(s)I is defined as any transfer function that can satisfy the following criteria:

$$|H(|\omega_r|)| = \frac{1}{|\omega_r|} \quad \sphericalangle H(|\omega_r|) = -\frac{\pi}{2} + \theta_p \qquad (13)$$

$$\lim_{\omega \to \infty} H(\omega) \sim \frac{1}{j\omega} \quad \lim_{\omega \to 0} H(\omega) \sim (j\omega)^2$$

Such criteria ensures that H(s) acts as an integrator at high frequencies, has constant phase shift at the electrical frequency of the motor 102 no matter the speed, and has −40 dB/dec of attenuation at low frequencies to eliminate DC offset due to integration and/or ADC (analog-to-digital conversion) offset and noise.

The phase shift $\theta_p$ at positive electrical frequencies $+\omega_r$ is positive as follows:

$$H(|\omega_r|) = \frac{1}{j|\omega_r|} \cdot e^{j\theta_p} \, (\theta_p > 0) \qquad (14)$$

In addition, since the impulse response h(t) is always real (no imaginary component), H(s) must have complex conjugate symmetry. Therefore:

$$H(-|\omega_r|) = H^*(|\omega_r|) = \frac{1}{-j|\omega_r|} \cdot e^{-j\theta_p} \, (\theta_p > 0) \qquad (15)$$

Combining equations (14) and (15), the following can be concluded:

$$H(\omega_r) = \frac{1}{j\omega_r} \cdot e^{j\theta_p \mathrm{sgn}(\omega_r)} (\theta_p > 0) \qquad (16)$$

That is, the phase shift ($\theta_p$) at positive electrical frequencies $+\omega_r$ is always positive and the phase shift ($-\theta_p$) at negative electrical frequencies ($-\omega_r$) is always negative.

Without loss of generalization, a scalar input to H(s) can be expressed as:

$$x(\theta_r) = X\cos(\theta_r) = X\cos(\omega_r t + \varphi) = \frac{X}{2}\left(e^{j\omega_r t}e^{j\varphi} + e^{-j\omega_r t}e^{-j\varphi}\right) \qquad (17)$$

where $\theta_r$, $\omega_r$, and $\varphi$ are the rotor angle, rotor electrical frequency, and phase offset of x, respectively.

The Fourier transform of equation (17) yields:

$$x(\omega) = \left(\frac{X}{2}\right)(2\pi)\left(e^{j\varphi}\delta(\omega - \omega_r) + e^{-j\varphi}\delta(\omega + \omega_r)\right) \qquad (18)$$

Therefore, the output of H(s) in the frequency domain can be represented as follows:

$$y(\omega) = x(\omega)H(\omega) = \qquad (19)$$
$$\left(\frac{X}{2}\right)(2\pi)\left(e^{j\varphi}\delta(\omega - \omega_r)H(\omega_r) + e^{-j\varphi}\delta(\omega + \omega_r)H(-\omega_r)\right)$$

Replacing $H(\omega_r)$ and $H(-\omega_r)$ according to equation (16) yields:

$$y(\omega) = \frac{X\pi}{j\omega_r}\left(e^{j\varphi}\delta(\omega - \omega_r)e^{j\theta_p \mathrm{sgn}(\omega_r)} - e^{-j\varphi}\delta(\omega + \omega_r)e^{-j\theta_p \mathrm{sgn}(\omega_r)}\right) = \qquad (20)$$
$$\frac{X\pi}{j\omega_r}\left(e^{j(\varphi + \theta_p \mathrm{sgn}(\omega_r))}\delta(\omega - \omega_r) - e^{-j(\varphi + \theta_p \mathrm{sgn}(\omega_r))}\delta(\omega + \omega_r)\right)$$

The output can then be transformed from the frequency domain back to the time domain as follows:

$$y(t) = \frac{1}{j\omega_r} \cdot \frac{X}{2}\left(e^{j(\varphi + \theta_p \mathrm{sgn}(\omega_r))}e^{j\omega_r t} - e^{-j(\varphi + \theta_p \mathrm{sgn}(\omega_r))}e^{-j\omega_r t}\right) = \qquad (21)$$
$$\frac{X}{\omega_r} \cdot \frac{1}{2j}\left(e^{j(\omega_r t + \varphi + \theta_p \mathrm{sgn}(\omega_r))} - e^{-j(\omega_r t + \varphi + \theta_p \mathrm{sgn}(\omega_r))}\right)$$

Using Euler's formula, equation (21) can be simplified as follows:

$$y(t) = \frac{1}{\omega_r} \cdot X\sin(\omega_r t + \varphi + \theta_p \mathrm{sgn}(\omega_r)) = \qquad (22)$$
$$\int X\cos(\omega_r t + \varphi + \theta_p \mathrm{sgn}(\omega_r))dt + c = \int x(\theta_r + \theta_p \mathrm{sgn}(\omega_r))dt + c$$

The constant phase shift $\theta_p'$ introduced by the first H(s) can be defined as follows:

$$\theta_p' = \theta_p \mathrm{sgn}(\omega_r) \qquad (23)$$

According to equation (22), when $e_{\alpha\beta}(\theta_r)$ is applied as the input of H(s), the output becomes:

$$\int e_{\alpha\beta}(\theta_r + \theta_p \mathrm{sgn}(\omega_r))dt = \lambda_{\alpha\beta}(\theta_r + \theta_p \mathrm{sgn}(\omega_r)) = \lambda_{\alpha\beta}(\theta_r + \theta_p') \qquad (24)$$

Equation (24) indicates that there is always a constant positive or negative phase shift $\theta_p'$ at positive or negative rotor electrical frequencies $\omega_r$, respectively.

The zero-phase-shift observer (control loop) 106 includes a block 200 that applies a phase shift matrix $R(-\theta_p')$ to the applied current vector $i_{\alpha\beta}(\theta_r)$ to generate a phase-shifted version $i_{\alpha\beta}(\theta_r + \theta_p')$ of the applied current vector $i_{\alpha\beta}(\theta_r)$ that has the same phase shift $\theta_p'$ as the magnetic flux vector output $\lambda_{\alpha\beta}(\theta_r + \theta_p')$ of the first filter H(s).

For example, a Park transform of angle $-\theta_p'$ can be applied to the SRF currents as follows:

$$R(-\theta_p')i_{\alpha\beta}(\theta_r) = \begin{bmatrix} \cos(\theta_p') & \sin(\theta_p') \\ -\sin(\theta_p') & \cos(\theta_p') \end{bmatrix}\begin{bmatrix} I\cos(\theta_r + \varphi) \\ -I\sin(\theta_r + \varphi) \end{bmatrix} = \qquad (25)$$
$$\begin{bmatrix} I\cos(\theta_r + \varphi + \theta_p') \\ -I\sin(\theta_r + \varphi + \theta_p') \end{bmatrix} = i_{\alpha\beta}(\theta_r + \theta_p')$$

Equation (25) indicates that by using the phase shift rotation matrix $R(-\theta_p')$, the phase shift $\theta_p$ in the current $i_{\alpha\beta}(\theta_r + \theta_p')$ will match that of the magnetic flux vector output $\lambda_{\alpha\beta}(\theta_r + \theta_p')$ of the first filter H(s).

The zero-phase-shift observer (control loop) 106 generates the adjusted magnetic flux vector $\lambda'_{\alpha\beta}(\theta_r+\theta'_p)$ from the magnetic flux vector output $\lambda_{\alpha62}(\theta_r+\theta'_p)$ of the first filter H(s) and the phase-shifted version $i_{\alpha\beta}(\theta_r+\theta'_p)$ of the applied current vector $i_{\alpha\beta}(\theta_r)$.

For example, the zero-phase-shift observer (control loop) 106 can generate the adjusted magnetic flux vector $\lambda'_{\alpha\beta}(\theta_r+\theta'_p)$ from the magnetic flux vector output $\lambda_{\alpha\beta}(\theta_r+\theta'_p)$ of the first filter H(s) and the phase-shifted version $i_{\alpha\beta}(\theta_r+\theta'_p)$ of the applied current vector $i_{\alpha\beta}(\theta_r)$ by scaling $L_q$ the phase-shifted version $i_{\alpha\beta}(\theta_r+\theta'_p)$ of the applied current vector $i_{\alpha\beta}(\theta_r)$ and subtracting (Block 202 in FIG. 2) the scaled and phase-shifted version of the applied current vector from the magnetic flux vector output $\lambda_{\alpha\beta}(\theta_r+\theta'_p)$ of the first filter H(s). Block 202 ensures that the adjusted magnetic flux vector $\lambda'_{\alpha\beta}(\theta_r+\theta'_p)$ (as a vector) is pointing to the direction of the rotor electrical angle $\theta_r$. If the adjusted magnetic flux vector $\lambda'_{\alpha\beta}(\theta_r+\theta'_p)$ is not calculated and instead if the magnetic flux vector output $\lambda_{\alpha\beta}(\theta_r+\theta'_p)$ of the first filter H(s) is used, the magnetic flux vector output $\lambda_{\alpha\beta}(\theta_r+\theta'_p)$ of the first filter H(s) is not aligned with the rotor electrical angle $\theta_r$ but instead is aligned with the stator electrical angle $\theta_e$. Accordingly, the magnetic flux vector output $\lambda_{\alpha\beta}(\theta_r+\theta'_p)$ of the first filter H(s) is used in SFO for extracting the stator angle $\theta_e$ and the adjusted magnetic flux vector $\lambda'_{\alpha\beta}(\theta_r+\theta'_p)$ is used in both RFO and SFO for extracting the rotor angle $\theta_r$.

The SRF fluxes and currents can be combined as follows:

$$\lambda'_{\alpha\beta}(\theta_r + \theta'_p) = \lambda_{\alpha\beta}(\theta_r + \theta'_p) - L_q R(-\theta'_p)i_{\alpha\beta}(\theta_r) = \quad (26)$$
$$\lambda_{\alpha\beta}(\theta_r + \theta'_p) - L_q i_{\alpha\beta}(\theta_r + \theta'_p) = R(-\theta_r - \theta'_p)(\lambda^r_{qd} - L_q i^r_{qd})$$

where $x^r_{qd}$ are the corresponding RRF variables in the rotor reference frame, where d-axis is aligned with the permanent magnet flux of the motor 102.

Expanding $\lambda^r_{qd} - L_q i^r_{qd}$ in equation (26) yields:

$$\lambda^r_{qd} - L_q i^r_{qd} = \begin{bmatrix} L_q i^r_q \\ \lambda_m + L_d i^r_d \end{bmatrix} - \begin{bmatrix} L_q i^r_q \\ L_q i^r_d \end{bmatrix} = \begin{bmatrix} 0 \\ \lambda_m + (L_d - L_q) i^r_d \end{bmatrix} \quad (27)$$

Equation (27) indicates that $\lambda^r_{qd} - L_q i^r_{qd}$ has no vector component along the q-axis, since the adjusted magnetic flux vector $\lambda'_{\alpha\beta}(\theta_r+\theta'_p)$ is in the same direction as the rotor electrical angle $\theta_r$ (used in SFO and RFO) but the magnetic flux vector output $\lambda_{\alpha\beta}(\theta_r+\theta'_p)$ of the first filter H(s) is in the same direction as stator electrical angle $\theta_e$ (used in SFO). Accordingly:

$$\lambda'_{\alpha\beta}(\theta_r + \theta'_p) = R(-\theta_r - \theta'_p)(\lambda^r_{qd} - L_q i^r_{qd}) = \quad (28)$$
$$\begin{bmatrix} \cos(\theta_r + \theta'_p) & \sin(\theta_r + \theta'_p) \\ -\sin(\theta_r + \theta'_p) & \cos(\theta_r + \theta'_p) \end{bmatrix} \begin{bmatrix} 0 \\ \lambda_m + (L_d - L_q)i^r_d \end{bmatrix} =$$
$$(\lambda_m + (L_d - L_q)i^r_d)\begin{bmatrix} \sin(\theta_r + \theta'_p) \\ \cos(\theta_r + \theta'_p) \end{bmatrix}$$

Using equation (28), the rotor angle can be extracted as follows.

$$\theta_r + \theta'_p = \tan^{-1}\left(\frac{\lambda'_\alpha}{\lambda'_\beta}\right) \quad (29)$$

As a byproduct, the magnitude of the adjusted magnetic flux vector $\lambda'_{\alpha\beta}(\theta_r+\theta'_p)$ is as follows:

$$|\lambda'_{\alpha\beta}(\theta_r + \theta'_p)| = (\lambda_m + (L_d - L_q)i^r_d) \quad (30)$$

This magnitude can be used to estimate the motor torque, as described later herein. The $\tan^{-1}(\bullet)$ function in equation (29) can be implemented using a PLL (phase lock loop) 204 as shown in FIG. 2. Accordingly, the zero-phase-shift observer (control loop) 106 can transform the adjusted magnetic flux vector $\lambda'_{\alpha\beta}(\theta_r+\theta'_p)$ using the PLL 204.

The PLL 204 includes a biquad filter 206 which low pass filters the rotor electrical frequency estimate $\hat{\omega}_r$. A sign operation block 208 of the PLL 204 identifies the sign (+ or −) of the filtered version of the rotor electrical frequency estimate $\hat{\omega}_{r,filt}$ output by the biquad filter 206. An angle change block 210 of the PLL 204 implements+/−angle change, depending on the sign of the filtered version of the rotor electrical frequency estimate $\hat{\omega}_{r,filt}$, as indicated by the sign operation 208.

The zero-phase-shift observer (control loop) 106 can estimate the rotor electrical angle $\hat{\theta}_r$ from the adjusted magnetic flux vector $\lambda'_{\alpha\beta}(\theta_r+\theta'_p)$. In an embodiment, a transformation block 212 of the zero-phase-shift observer (control loop) 106 transforms the adjusted magnetic flux vector $\lambda'_{\alpha\beta}(\theta_r+\theta'_p)$ by the estimated rotor electrical angle or plus the constant phase shift $\theta'_p$ introduced by the first filter H(s).

For example, the transformation block 212 can implement a Park transform of the adjusted magnetic flux vector $\lambda'_{\alpha\beta}(\theta_r+\theta'_p)$ using the estimated rotor electrical angle $\hat{\theta}_r$ and apply the same offset $\theta'_p$ which yields the following:

$$\lambda''_{qd} = R(\hat{\theta}_r + \theta'_p)\lambda'_{\alpha\beta}(\theta_r + \theta'_p) = \quad (31)$$
$$[\lambda_m + (L_d - L_q)i^r_d]\begin{bmatrix} \cos(\hat{\theta}_r + \theta'_p) & -\sin(\hat{\theta}_r + \theta'_p) \\ \sin(\hat{\theta}_r + \theta'_p) & \cos(\hat{\theta}_r + \theta'_p) \end{bmatrix}\begin{bmatrix} \sin(\theta_r + \theta'_p) \\ \cos(\theta_r + \theta'_p) \end{bmatrix} =$$
$$[\lambda_m + (L_d - L_q)i^r_d]\begin{bmatrix} \sin(\theta_r - \hat{\theta}_r) \\ \cos(\theta_r - \hat{\theta}_r) \end{bmatrix}$$

The transformation block 212 can generate an error vector $\lambda''_q$ from quadrature axis (q) components of the transformed vector and a magnitude vector $\lambda''_d$ from direct axis (d) components of the transformed vector as follows:

$$\lambda''_q = [\lambda_m + (L_d - L_q)i^r_d]\sin\underbrace{(\theta_r - \hat{\theta}_r)}_{\theta_{r,error}} \quad (32)$$

$$\lambda''_d = [\lambda_m + (L_d - L_q)i^r_d]\cos\underbrace{(\theta_r - \hat{\theta}_r)}_{\theta_{r,error}} \quad (33)$$

Figure 3:
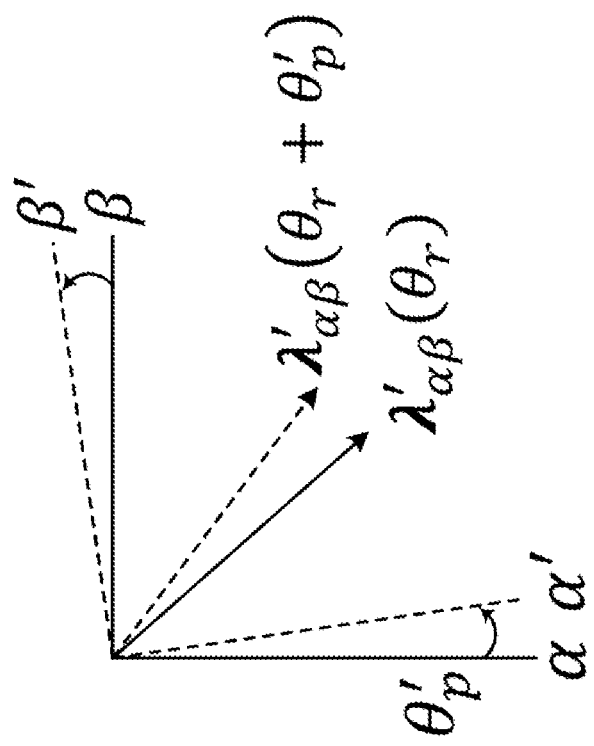
FIG. 3 illustrates a rotation in SRF (stationary-reference-frame) coordinates and the corresponding effect on the phase-shift of signals in the time domain.

FIG. 3 illustrates a rotation in SRF coordinates and the corresponding effect on the phase-shift of the signals in the time domain. FIG. 3 shows how $\lambda'_{\alpha\beta}(\theta_r+\theta'_p)$ in the α'β' frame has identical vector components to those of $\lambda'_{\alpha\beta}(\theta_r)$ in the αβ frame. Accordingly, the zero-phase-shift observer (control loop) 106 can compensate for the phase-shift in the time domain by adding $\theta'_p$ to the rotation angle $\hat{\theta}_r$ (Block 214) in the Park transform $R(\theta_r+\theta'_p)$ as shown in FIG. 2 and as mathematically shown in equation (31), as well. If the PLL 204 is stable, the steady state error is always zero, i.e., $\theta_{r,error}=0$. Therefore, the d-axis component converges to $[\lambda_m+(L_d-L_q)i^r{}_d]$ and $\hat{\theta}_r$ converges to $\theta_r$.

The torque of the PMSM 102, whether IPM or SPM, can be expressed as:

$$T = \frac{3}{2} \cdot \frac{P}{2}(\lambda_d^r i_q^r - \lambda_q^r i_d^r) = \frac{3}{2} \cdot \frac{P}{2}(\lambda_m + (L_d - L_q)i_d^r)i_q^r = \quad (34)$$

A torque estimation block 216 of the zero-phase-shift observer (control loop) 106 can estimate the motor torque $\hat{T}$ from the magnitude vector $\lambda^{r''}{}_d$ estimated by the PLL 204 in steady state as follows:

$$\hat{T} = \frac{3}{2} \cdot \frac{P}{2} \lambda_d'' i_q^r \quad (35)$$

A PI (proportional integral) controller block 218 of the PLL 204 has a proportional term kp and an integral term $k_i/s$ for estimating the rotor electrical frequency $\hat{\omega}_r$ based on the error $\lambda^{r'}{}_q$ generated by the transformation block 212 from the quadrature axis (q) components of the transformed vector. The rotor electrical frequency estimate $\hat{\omega}_r$ is input to the biquad filter 206 and to an integration block 220 that generates an estimate of the rotor electrical angle $\hat{\theta}_r$. The biquad filter 206 generates a filtered version of the rotor electrical frequency estimate $\hat{\omega}_{r,filt}$ the absolute value of which is provided to the first filter H(s) via block 222 which ignores the sign (+/−) of the filtered version of the rotor electrical frequency estimate $\hat{\omega}_{r,filt}$.

Figure 4:
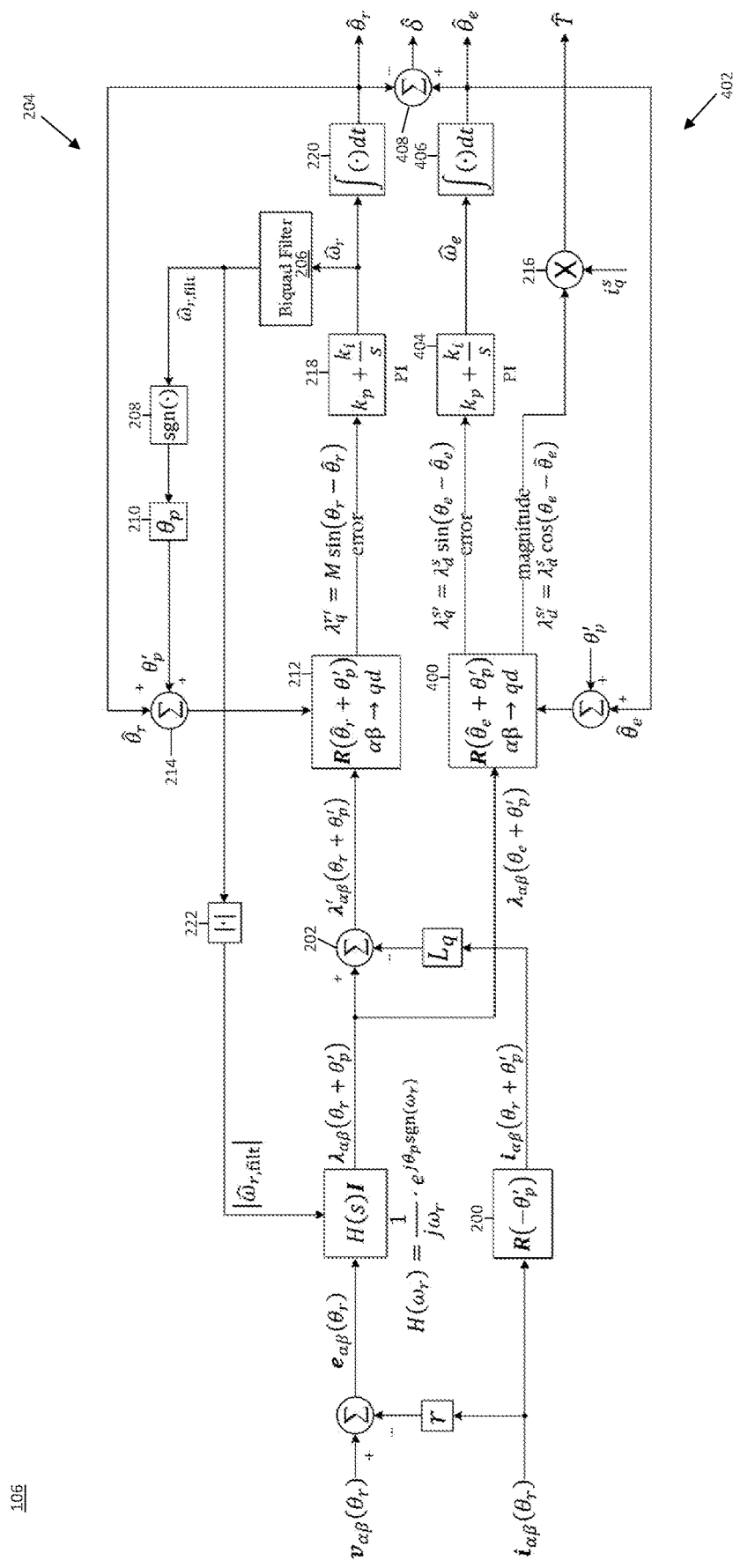
FIG. 4 illustrates a schematic diagram of the zero-phase-shift observer (control loop) included in the adaptive motor controller, in SFO (stator frame orientation) control.

FIG. 4 illustrates a block diagram of the zero-phase-shift observer (control loop) 106 in SFO control. In SFO control, and in addition to the rotor electrical angle $\omega_r$, the stator electrical angle $\theta_e$, stator flux magnitude $\lambda_d^s$, and load angle $\delta$ are used to control the system. In FIG. 4, the zero-phase-shift observer (control loop) 106 is configured for SFO control and estimates each of the rotor electrical angle $\hat{\theta}_r$, stator electrical angle $\hat{\theta}_e$, stator flux magnitude $\lambda^{s'}{}_d$, and load angle $\hat{\delta}$ from the magnetic flux vector $\lambda_{\alpha\beta}(\theta_r+\theta'_p)$ and adjusted magnetic flux vector $\lambda'_{\alpha\beta}(\theta_r+\theta'_p)$. The zero-phase-shift observer (control loop) 106 estimates the rotor electrical angle $\hat{\theta}_r$ as explained above in connection with the RFO implementation illustrated in FIG. 2.

The zero-phase-shift observer (control loop) 106 estimates the stator electrical angle $\hat{\theta}_e$ and the stator flux magnitude $\lambda^{s'}{}_d$ by transforming the magnetic flux vector output $\lambda_{\alpha\beta}(\theta_r+\theta'_p)$ of the first filter H(s) by an angle equal to the positive stator electrical angle plus the constant phase shift introduced by the first filter H(s).

In more detail, the stator electrical angle and the corresponding SFO are defined such that:

$$\lambda_q^s = 0 @ \theta_e \quad (36)$$

That is, in SFO control, all of the stator flux is aligned with the d-axis.

With a change of variable from $\theta_r$ to $\theta_e$, a deductive reasoning similar to equations (17)-(24) can be used to derive $\lambda_{\alpha\beta}$ in terms of the stator electrical angle $\theta_e$ as follows:

$$\lambda_{\alpha\beta}(\theta_e + \theta'_p) = \lambda_{\alpha\beta}(\theta_r + \theta'_p) \quad (37)$$

A second transformation block 400 of the zero-phase-shift observer (control loop) 106 applies a Park transform with angle $\theta_e \mp \theta'_p$ to the fluxes in equation (37) to obtain the following:

$$\lambda_{\alpha\beta}(\theta_e + \theta'_p) = R(-\theta_e - \theta'_p)\lambda_{qd}^s = \quad (38)$$

$$\begin{bmatrix} \cos(\theta_e + \theta'_p) & \sin(\theta_e + \theta'_p) \\ -\sin(\theta_e + \theta'_p) & \cos(\theta_e + \theta'_p) \end{bmatrix}\begin{bmatrix} 0 \\ \lambda_d^s \end{bmatrix} = \lambda_d^s \begin{bmatrix} \sin(\theta_e + \theta'_p) \\ \cos(\theta_e + \theta'_p) \end{bmatrix}$$

The angle used in the second transformation block 400 is positive but in equation (38), the input vector is expressed in terms of the output vector of the second transformation block 400, so the angle is negative of what is applied.

Therefore, the stator electrical angle $\theta_e$ and the stator flux magnitude $\lambda^s{}_d$ can be extracted as follows:

$$\theta_e + \theta'_p = \tan^{-1}\left(\frac{\lambda_\alpha}{\lambda_\beta}\right) \quad (39)$$

$$|\lambda_{\alpha\beta}(\theta_e + \theta'_p)| = \lambda_d^s \quad (40)$$

To realize the $\tan^{-1}(\bullet)$ function in equation (39), the zero-phase-shift observer (control loop) 106 includes a second PLL 402 to extract the stator electrical angle estimate $\hat{\theta}_e$. The second PLL 402 includes a second PI controller block 404 that has a proportional term kp and an integral term $k_i/s$ for estimating the stator electrical frequency $\hat{\omega}_e$ based on the error $\lambda^{s'}{}_q$ generated by the second transformation block 400 from the quadrature axis (q) components of the transformed vector $\lambda_{\alpha\beta}(\theta_e+\theta'_p)$. The stator electrical frequency estimate $\hat{\omega}_e$ is input to another integration block 406 that generates an estimate of the stator electrical angle $\hat{\theta}_e$.

As seen in FIG. 4, the magnetic flux vector output $\lambda_{\alpha\beta}(\theta_r+\theta'_p)$ of the first filter H(s) is fed to the second PLL 402 with a Park transform 400 as follows:

$$\lambda_{qd}^{s'} = R(\hat{\theta}_e + \theta'_p)\lambda_{\alpha\beta}(\theta_e + \theta'_p) = \quad (41)$$

$$\lambda_{ds}^s\begin{bmatrix} \cos(\hat{\theta}_e + \theta'_p) & -\sin(\hat{\theta}_e + \theta'_p) \\ \sin(\hat{\theta}_e + \theta'_p) & \cos(\hat{\theta}_e + \theta'_p) \end{bmatrix}\begin{bmatrix} \sin(\theta_e + \theta'_p) \\ \cos(\theta_e + \theta'_p) \end{bmatrix} = \lambda_d^s\begin{bmatrix} \sin(\theta_e - \hat{\theta}_e) \\ \cos(\theta_e - \hat{\theta}_e) \end{bmatrix}$$

As seen in equation (41), the q-axis and d-axis components of the Park transform are the error and magnitude signals, respectively, as given by:

$$\lambda_q^{s'} = \lambda_d^s \sin\underbrace{(\theta_e - \hat{\theta}_e)}_{\theta_{e,error}} \quad (42)$$

$$\lambda_d^{s'} = \lambda_d^s \cos\underbrace{(\theta_e - \hat{\theta}_e)}_{\theta_{e,error}} \quad (43)$$

If the second PLL 402 is stable, the error ($\theta_{e,error}$) is zero in steady state. Accordingly, the stator electrical angle estimate $\hat{\theta}_e$ and the stator flux magnitude estimate $\lambda^{s'}{}_d$ converge to the stator electrical angle $\theta_e$ and the stator flux magnitude $\lambda^s{}_d$, respectively.

The torque in SFO control can be expressed as:

$$T = \frac{3}{2} \cdot \frac{P}{2} (\lambda_d^s i_q^s - \lambda_q^s i_d^s) = \frac{3}{2} \cdot \frac{P}{2} \lambda_d^s i_q^s \quad (44)$$

Therefore, the second PLL 402 can estimate the motor torque $\hat{T}$ from the stator flux magnitude estimate $\lambda_d^s$ and the quadrature axis (q) components of the motor current vector $i_q^s$, as a byproduct of the stator electrical angle $\hat{\theta}_e$ estimation as follows:

$$\hat{T} = \frac{3}{2} \cdot \frac{P}{2} \lambda_d^{s'} i_q^s \quad (45)$$

In addition, the zero-phase-shift observer (control loop) 106 can estimate the load angle $\hat{\delta}$ by subtracting (Block 408) the rotor electrical angle estimate $\hat{\theta}_r$ from the stator electrical angle estimate $\hat{\theta}_e$ as follows:

$$\hat{\delta} = \hat{\theta}_e - \hat{\theta}_r \quad (46)$$

The first filter H(s) of the zero-phase-shift observer (control loop) 106 is an adaptive flux extraction filter and described next in more detail with reference to FIG. 5. The first filter H(s) has a plurality of coefficients $c_1$, $c_2$, $c_3$. The zero-phase-shift observer (control loop) 106 adjusts one or more of the coefficients $c_1$, $c_2$, $c_3$ of the first filter H(s) based on the rotor electrical frequency estimate $\hat{\omega}_r$ such that the constant phase shift $\theta'_p$ introduced by the first filter H(s) remains independent of motor speed.

Without loss of generality, the transfer function H(s)I that represent the first filter H(s) may be represented as any transfer function that satisfies the criteria defined in equation (13). Since the phase shift $\theta'_p$ of the first filter H(s) is always constant at $|\omega_r|$, this indicates that the first filter H(s) is an adaptive transfer function whose coefficients $c_1$, $c_2$, $c_3$ change according to the operating point of the system. Without loss of generality, a specific realization of such an adaptive transfer function is as follows:

$$H(s) = \frac{1}{A} G(s) \quad A = |\omega_r G(\omega_r)| \quad \lim_{\omega \to \infty} |j\omega G(\omega)| = 1 \quad (47)$$

$$G(s) = \frac{\frac{1}{s}}{1 + \frac{1}{s}\left(c_1 + \frac{1}{s}\left(c_2 + \frac{c_3}{s}\right)\right)} = \frac{s^2}{s^3 + c_1 s^2 + c_2 s + c_3} \quad (48)$$

The third-degree polynomial in the denominator of equation (48) can be factored such that each root is proportional to the absolute electrical frequency of the rotor $|\omega_r|$ as follows:

$$G(s) = \frac{s^2}{(s + k_1|\omega_r|)(s + k_2|\omega_r|)(s + k_3|\omega_r|)} = $$

$$\frac{s^2}{s^3 + (k_1 + k_2 + k_3)|\omega_r|s^2 + (k_1 k_2 + k_2 k_3 + k_1 k_3)|\omega_r|^2 s + (k_1 k_2 k_3)|\omega_r|^3} \quad (49)$$

By equating equations (48) and (49), the filter coefficients $\{c_1, c_2, c_3\}$ can be determined as follows:

$$\begin{cases} c_1 = \underbrace{(k_1 + k_2 + k_3)|\omega_r|}_{c'_1} = c'_1 |\omega_r| \\ c_2 = \underbrace{(k_1 k_2 + k_2 k_3 + k_1 k_3)|\omega_r|^2}_{c'_2} = c'_2 |\omega_r|^2 \\ c_3 = \underbrace{(k_1 k_2 k_3)|\omega_r|^3}_{c'_3} = c'_3 |\omega_r|^3 \end{cases} \quad (50)$$

The first filter H(s) can be evaluated at $s=j\omega_r$ to see if the criteria in equation (13) are satisfied, as follows:

$$G(\omega_r) = \frac{(j\omega_r)^2}{(j\omega_r)^3 + c'_1|\omega_r|(j\omega_r)^2 + c'_2|\omega_r|^2(j\omega_r) + c'_3|\omega_r|^3} = $$

$$\frac{1}{j\omega_r} \cdot \frac{j^3}{j^3 + j^2 c'_1 \text{sgn}(\omega_r) + jc'_2 + c'_3 \text{sgn}(\omega_r)} = $$

$$\frac{1}{j\omega_r} \cdot \frac{1}{1 - jc'_1 \text{sgn}(\omega_r) - c'_2 + jc'_3 \text{sgn}(\omega_r)} = $$

$$\frac{1}{j\omega_r} \cdot \frac{1}{(1 - c'_2) - j\text{sgn}(\omega_r)(c'_1 - c'_3)} = \frac{1}{j\omega_r} \cdot \frac{(1 - c'_2) + j\text{sgn}(\omega_r)(c'_1 - c'_3)}{(1 - c'_2)^2 + (c'_1 - c'_3)^2} \quad (51)$$

If A is selected such that:

$$\frac{1}{A} = \sqrt{(1 - c'_2)^2 + (c'_1 - c'_3)^2} = $$

$$\sqrt{(1 - (k_1 k_2 + k_2 k_3 + k_1 k_3))^2 + ((k_1 + k_2 + k_3) - (k_1 k_2 k_3))^2}, \quad (52)$$

then $|H(|\omega_r|)|=1/\omega_r$. Accordingly, the first criteria in equation (13) is satisfied.

Also, the phase shift at $\omega_r$ can be found by examining equation (51) as follows:

$$\theta'_p = \tan^{-1}\left(\frac{\text{sgn}(\omega_r)(c'_1 - c'_3)}{(1 - c'_2)}\right) = \text{sgn}(\omega_r)\tan^{-1}\left(\frac{c'_1 - c'_3}{1 - c'_2}\right) = \text{sgn}(\omega_r)\theta_p \quad (53)$$

where:

$$\theta_p = \tan^{-1}\left(\frac{c'_1 - c'_3}{1 - c'_2}\right) = \tan^{-1}\left(\frac{(k_1 + k_2 + k_3) - (k_1 k_2 k_3)}{1 - (k_1 k_2 + k_2 k_3 + k_1 k_3)}\right) \quad (54)$$

Accordingly, the second criteria in equation (13) is also satisfied.

In addition, since the nominator and denominator of H(s) are second-degree and third-degree polynomials, then $$\lim_{\omega \to \infty} H(\omega) \sim 1/j\omega \text{ and } \lim_{\omega \to 0} H(\omega) \sim (j\omega)^2.$$

Accordingly, the third and fourth criteria in equation (13) are also satisfied.

Figure 5:
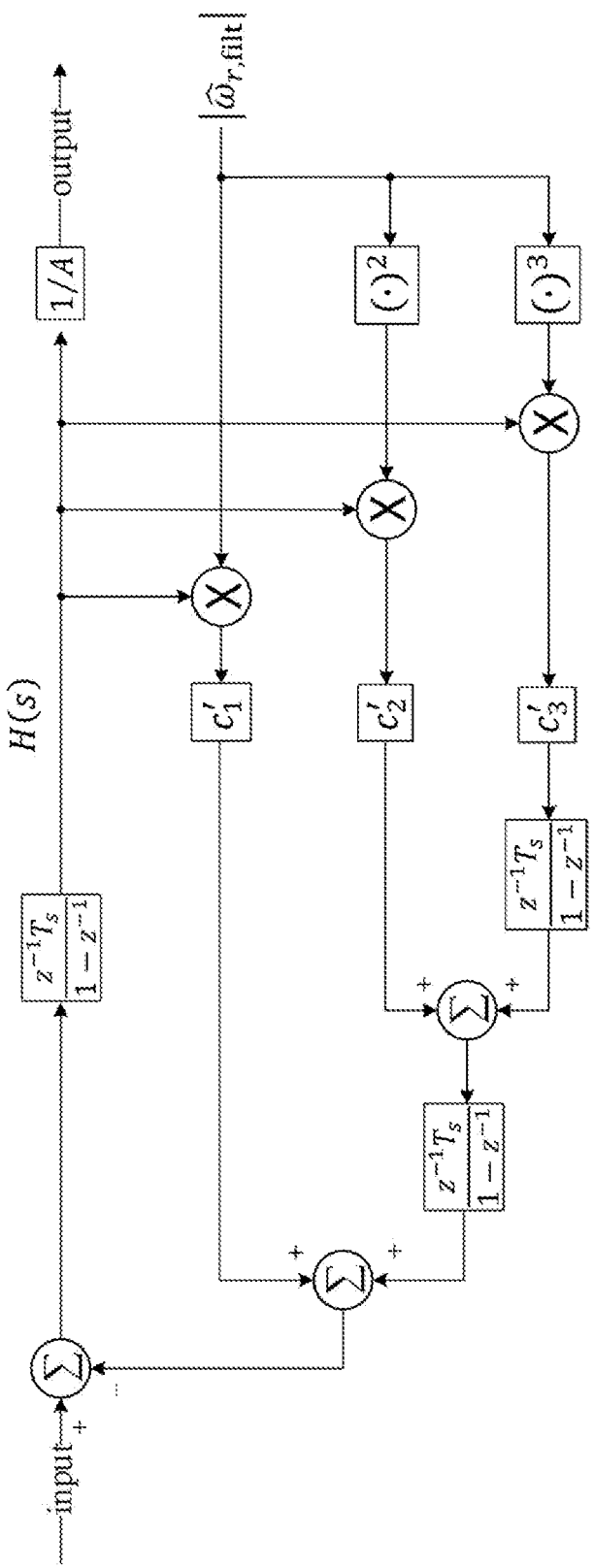
FIG. 5 illustrates a schematic diagram of a first filter H(s) of the zero-phase-shift observer (control loop) included in the adaptive motor controller.

In FIG. 5, a discrete-time accumulator equivalent to 1/s is used since the system will be implemented in the discrete-time domain inside a microcontroller as follows:

$$G(z) = \frac{z^{-1}T_s}{1-z^{-1}} \approx \frac{1}{s} \quad (55)$$

The biquad filter 206 of the zero-phase-shift observer (control loop) 106 is described next in more detail with reference to FIG. 6. As seen in the block diagrams for SFO and RFO observer embodiments in FIGS. 2 and 4, respectively, the estimated rotor electrical frequency $\hat{\omega}_r$ is fed back from the first PLL 204 to the first filter H(s) and to the transformation block 212. The biquad filter 206 applies enough attenuation at high frequencies to the estimated rotor electrical frequency $\hat{\omega}_r$ to reject high frequency noise and stabilize the system. Any stabilizing low pass filter can be employed here. Without loss of generalization, a biquad filter 206 is used.

In continuous-time, the biquad filter 206 can be expressed as:

$$H(s) = \frac{a_0 + a_1 s + a_2 s^2}{b_0 + b_1 s + b_2 s^2} = \quad (56)$$

$$K\frac{(s/\omega_{z1}+1)(s/\omega_{z2}+1)}{(s/\omega_{p1}+1)(s/\omega_{p2}+1)} = K\frac{1+(1/\omega_{z1}+1/\omega_{z2})s+s^2/(\omega_{z1}\omega_{z2})}{1+(1/\omega_{p1}+1/\omega_{p2})s+s^2/(\omega_{p1}\omega_{p2})}$$

where $$\begin{cases} a_0 = K \\ a_1 = K(1/\omega_{z1}+1/\omega_{z2}) \\ a_2 = K/(\omega_{z1}\omega_{z2}) \end{cases} \begin{cases} b_0 = 1 \\ b_1 = 1/\omega_{p1}+1/\omega_{p2} \\ b_2 = 1/(\omega_{p1}\omega_{p2}) \end{cases} \quad (57)$$

and K, $\omega_{zi}$, and $\omega_{pi}$ are the dc gain, zeros, and poles of the system, respectively.

If the sampling frequency $f_s$ is high enough compared to the bandwidth of the system, a simple forward Euler discretization can be used to go from continuous-time to discrete-time domain as follows:

$$s = (1-z^{-1})f_s \quad (58)$$

Applying equation (58) to equation (56), yields:

$$H(z) = \frac{a_0 + a_1 f_s(1-z^{-1}) + a_2 f_s^2(1-z^{-1})^2}{b_0 + b_1 f_s(1-z^{-1}) + b_2 f_s^2(1-z^{-1})^2} = \frac{m_0 + m_1 z^{-1} + m_2 z^{-2}}{n_0 + n_1 z^{-1} + n_2 z^{-2}} \quad (59)$$

where $$\begin{cases} m_0 = a_0 + a_1 f_s + a_2 f_s^2 \\ m_1 = -(a_1 f_s + 2a_2 f_s^2) \\ m_2 = a_2 f_s^2 \end{cases} \begin{cases} n_0 = b_0 + b_1 f_s + b_2 f_s^2 \\ n_1 = -(b_1 f_s + 2b_2 f_s^2) \\ n_2 = b_2 f_s^2 \end{cases} \quad (60)$$

To simplify the computations inside the microcontroller, the discrete-time coefficients can be scaled as follows:

$$\begin{cases} m_0 \leftarrow m_0/n_0 \\ m_1 \leftarrow m_1/n_0 \\ m_2 \leftarrow m_2/n_0 \end{cases} \begin{cases} n_0 \leftarrow n_0/n_0 = 1 \\ n_1 \leftarrow n_1/n_0 \\ n_2 \leftarrow n_2/n_0 \end{cases} \quad (61)$$

A Direct-Form-II realization of the digital filter expressed in equation (59) can be used as follows:

$$Y(z) = \quad (62)$$

$$\frac{m_0 + m_1 z^{-1} + m_2 z^{-2}}{1 + n_1 z^{-1} + n_2 z^{-2}} X(z) = \underbrace{\left(\frac{X(z)}{1 + n_1 z^{-1} + n_2 z^{-2}}\right)}_{D(z)}(m_0 + m_1 z^{-1} + m_2 z^{-2})$$

where $$\begin{cases} D(z) = \dfrac{X(z)}{1 + n_1 z^{-1} + n_2 z^{-2}} \\ Y(z) = D(z)(m_0 + m_1 z^{-1} + m_2 z^{-2}) \end{cases} \quad (63)$$

Accordingly, the time-domain equivalent of equation (63) is:

$$\begin{cases} d_n = x_n - n_1 d_{n-1} - n_2 d_{n-2} \\ y_n = m_0 d_n - m_1 d_{n-1} - m_2 d_{n-2} \end{cases} \quad (64)$$

Figure 6:
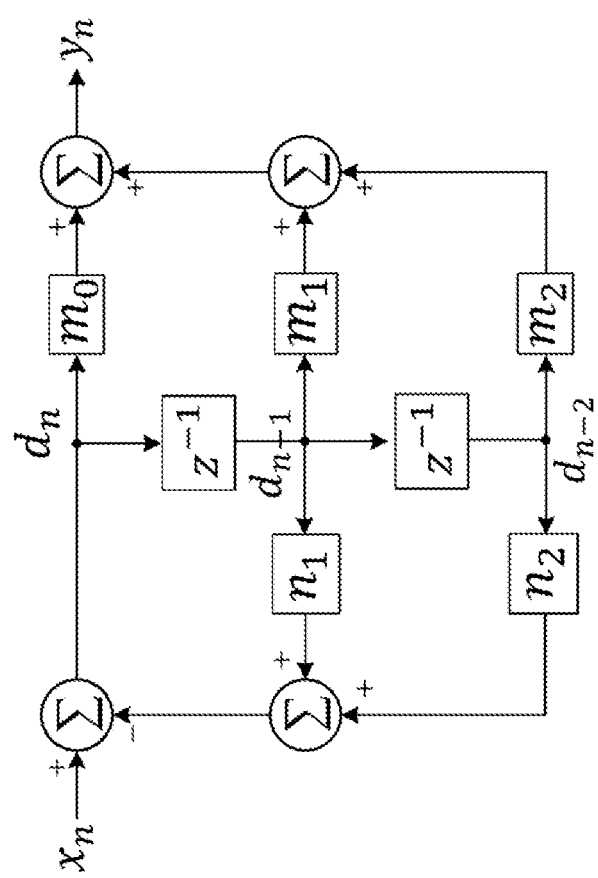
FIG. 6 illustrates a schematic diagram of a biquad filter of the zero-phase-shift observer (control loop) included in the adaptive motor controller.

The block diagram of the biquad filter 206 illustrated in FIG. 6 represents the time-domain realization in equation (64).

Without loss of generality, a critically-damped second-order low-pass-filter can be used as the low pass filter 206 of the zero-phase-shift observer (control loop) 106 as follows:

$$\begin{cases} K = 1 \\ \omega_{z1} = \omega_{z2} = \infty \\ \omega_{p1} = \omega_{p2} = \omega_p \end{cases} \Rightarrow \begin{cases} a_0 = b_0 = 1 \\ a_1 = a_2 = 0 \\ b_1 = 2/\omega_p, b_2 = 1/\omega_p^2 \end{cases} \Rightarrow \quad (65)$$

$$\begin{cases} m_0 = \dfrac{\omega_p^2}{\omega_p^2 + 2\omega_p f_s + f_s^2} \\ m_1 = 0 \\ m_2 = 0 \end{cases} \begin{cases} n_0 = 1 \\ n_1 = \dfrac{-2(\omega_p f_s + f_s^2)}{\omega_p^2 + 2\omega_p f_s + f_s^2} \\ n_2 = \dfrac{f_s^2}{\omega_p^2 + 2\omega_p f_s + f_s^2} \end{cases} \quad (66)$$

Figure 7:
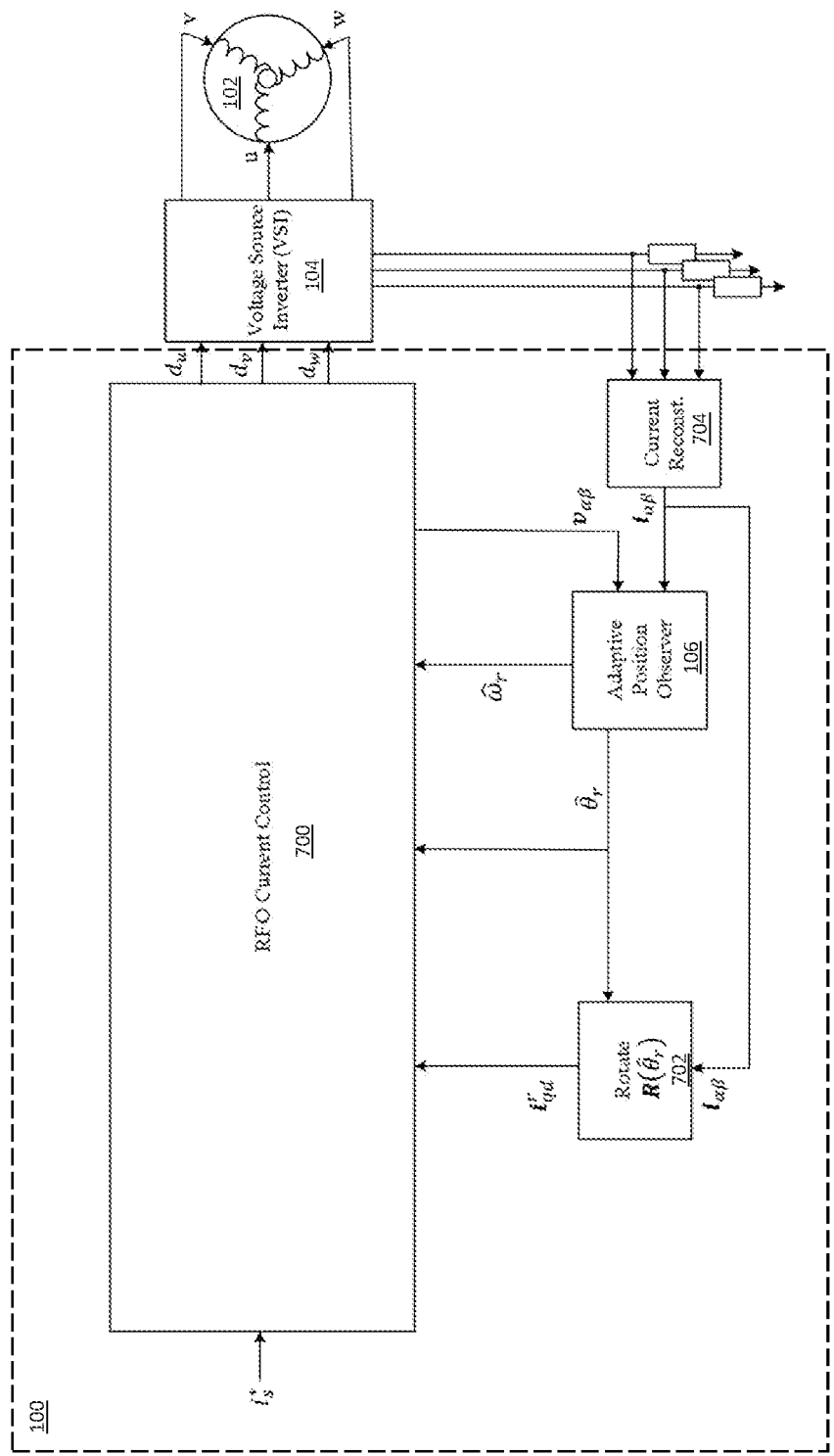
FIG. 7 illustrates a schematic diagram of the adaptive motor controller configured for RFO control and for implementing motor current control.

FIG. 7 illustrates a schematic diagram of the motor controller 100 configured for RFO control and for implementing motor current control based on the rotor electrical angle estimate $\hat{\theta}_r$ and electrical speed estimate $\hat{\omega}_r$ generated by the zero-phase-shift observer (control loop) 106. A current control loop 700 implements RRF control based on the estimated rotor angular position $\hat{\theta}_r$ and electrical speed estimate $\hat{\omega}_r$ generated by the zero-phase-shift observer (control loop) 106 and a current command i*$_s$. Accordingly, the estimated rotor angular position $\hat{\theta}_r$ can be used not only for transforming the currents from SRF to RRF but also transforming the resulting voltage commands from RRF back to SRF for the inverter 104. The motor controller 100 also includes a transformation block 702 that generates the current RRF variable i$^r_{qd}$ in the rotor reference frame based on the applied current vector i$_{\alpha\beta}$ which is provided by a current reconstruction circuit 704.

Figure 8:
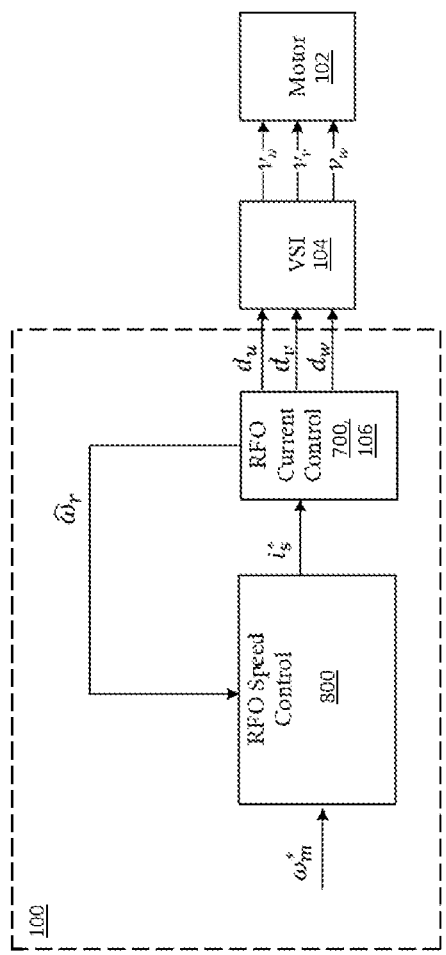
FIG. 8 illustrates a schematic diagram of the adaptive motor controller configured for both RFO current and speed control.

FIG. 8 illustrates a schematic diagram of the motor controller 100 configured for both RFO current and speed control. In FIG. 8, the motor controller 100 utilizes both a current control loop 700 and a speed control loop 800 when speed control is desired in RFO. The speed control loop 800, which can include, e.g., one or more PI controllers, filters, etc., generates the current command $i^*_s$ for the current control loop 700 based on the rotor electrical frequency estimate $\hat{\omega}_r$ generated by the zero-phase-shift observer (control loop) 106 and a reference motor speed $\omega^*_m$. Feed forward terms can be used to improve the dynamic response of the system in FIG. 8.

Figure 9:
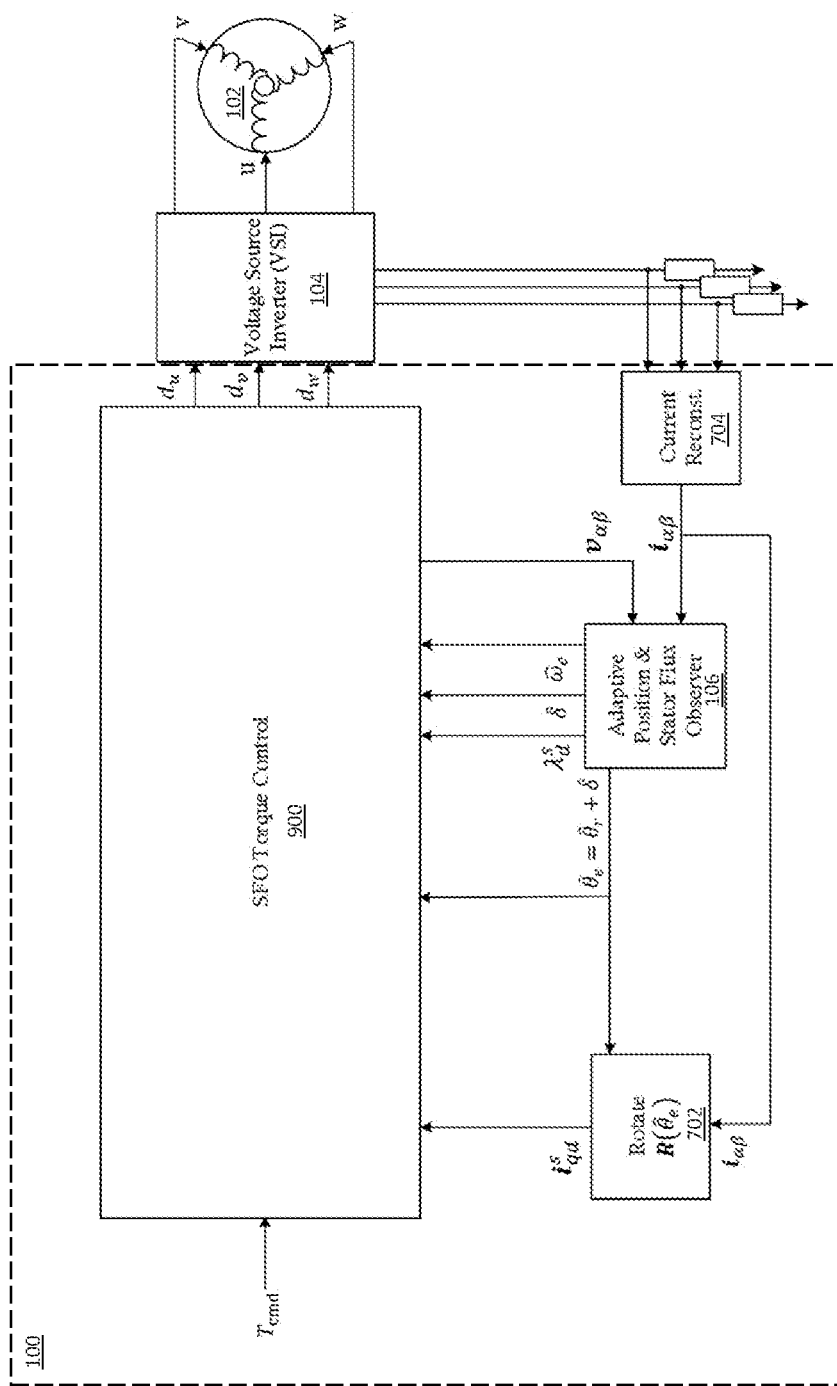
FIG. 9 illustrates a schematic diagram of the adaptive motor controller configured for SFO torque control.

FIG. 9 illustrates a schematic diagram of the motor controller 100 configured for SFO torque control. In FIG. 9, the motor controller 10 includes an SFO-based torque control loop 900 that implements motor torque control based on the rotor electrical angle estimate $\hat{\theta}_r$, the stator electrical angle estimate $\hat{\theta}_e$, the stator flux magnitude estimate $\lambda^s_d$, and the load angle estimate $\hat{\delta}$ generated by the zero-phase-shift observer (control loop) 106. All of these variables are used in different parts of the SFO-based torque control loop 900 and enable the SFO-based torque control loop 900 to control the motor torque in response to a torque command $T_{cmd}$, which can include, e.g., one or more PI controllers, filters, etc.

Figure 10:
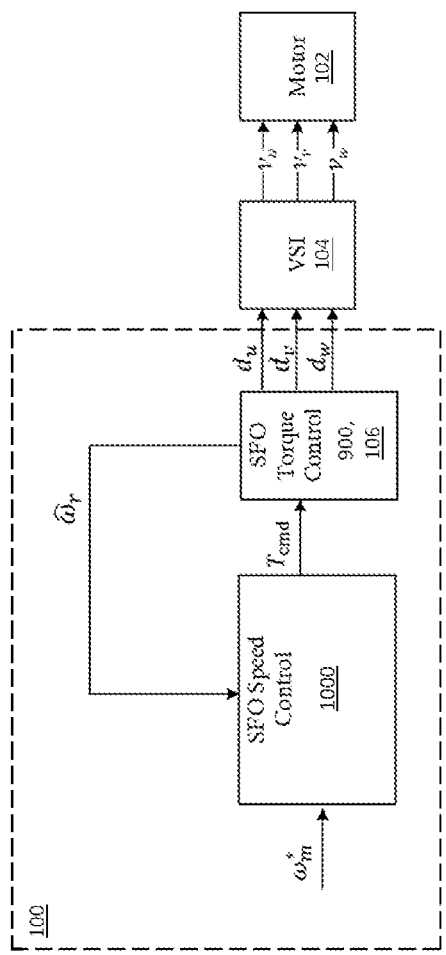
FIG. 10 illustrates a schematic diagram of the adaptive motor controller configured for both SFO torque and speed control.

FIG. 10 illustrates a schematic diagram of the motor controller 100 configured for both SFO torque and speed control. In FIG. 10, the motor controller 100 utilizes both a torque control loop 900 and a speed control loop 1000 when speed control is desired in SFO. The speed control loop 1000, which can include, e.g., one or more PI controllers, filters, etc., generates the torque command $T_{cmd}$ for the torque control loop 900 based on the rotor electrical frequency estimate $\hat{\omega}_r$ generated by the zero-phase-shift observer (control loop) 106 and a reference motor speed $\omega^*_m$. Feed forward terms can be used to improve the dynamic response of the system in FIG. 10.

Although the zero-phase-shift observer (control loop) 106 is described herein in the context of PMSM applications, the flux observer part of the SFO observer architecture can also be used for observing the stator flux of induction motors, as well, and without loss of generalization.

Although the present disclosure is not so limited, the following numbered examples demonstrate one or more aspects of the disclosure.

Example 1. A controller for a permanent magnet synchronous motor, the controller comprising: a first control loop comprising a first filter, wherein the first filter has a back-EMF voltage vector input, a magnetic flux vector output with a constant phase shift that is independent of motor speed, and an amplitude response that is inversely proportional to rotor electrical frequency, wherein the first control loop is configured to: generate an adjusted magnetic flux vector from the magnetic flux vector output by the first filter and compensate for the constant phase shift introduced by the first filter; estimate the rotor electrical frequency from the adjusted magnetic flux vector; and feedback a filtered version of the rotor electrical frequency estimate to the first filter as an estimation of the rotor electrical frequency.

Example 2. The controller of example 1, wherein the first control loop is further configured to: generate the back-EMF voltage vector from an applied motor voltage vector and an applied motor current vector in a stationary reference frame; apply a phase shift to the applied current vector to generate a phase-shifted version of the applied current vector that has the same phase shift as the magnetic flux vector output by the first filter; and generate the adjusted magnetic flux vector from the magnetic flux vector output by the first filter and the phase-shifted version of the applied current vector.

Example 3. The controller of example 2, wherein the first control loop is configured to generate the adjusted magnetic flux vector by scaling the phase-shifted version of the applied current vector and subtracting the scaled and phase-shifted version of the applied current vector from the magnetic flux vector output by the first filter.

Example 4. The controller of example 2 or 3, wherein the first control loop is configured to apply a phase shift to the applied current vector by using a rotation matrix with fixed angle.

Example 5. The controller of any of examples 1 through 4, wherein the first control loop is further configured to estimate rotor electrical angle from the adjusted magnetic flux vector.

Example 6. The controller of example 5, wherein the first control loop is configured to estimate the rotor electrical frequency from the adjusted magnetic flux vector by transforming the adjusted magnetic flux vector by the estimated rotor electrical angle plus the constant phase shift introduced by the first filter.

Example 7. The controller of example 6, wherein the first control loop is configured to transform the adjusted magnetic flux vector using a phase-locked loop.

Example 8. The controller of example 6 or 7, wherein the first control loop is further configured to generate an error vector from quadrature axis components of the transformed vector and a magnitude vector from direct axis components of the transformed vector.

Example 9. The controller of example 8, wherein the first control loop is further configured to estimate motor torque from the magnitude vector.

Example 10. The controller of example 9, wherein the first control loop is configured to estimate the motor torque using a phase-locked loop.

Example 11. The controller of any of examples 5 through 9, wherein the controller is configured for rotor frame orientation (RFO) control and comprises a second control loop configured to implement motor current control based on the rotor electrical angle estimate generated by the first control loop.

Example 12. The controller of example 11, wherein the second control loop is further configured to implement motor speed control based on the rotor electrical frequency estimate generated by the first control loop.

Example 13. The controller of any of examples 1 through 12, wherein the controller is configured for stator frame orientation (SFO) control, and wherein the first control loop is further configured to estimate each of rotor electrical angle, stator electrical angle, stator flux magnitude, and load angle from the magnetic flux vector output by the first filter and the adjusted magnetic flux vector.

Example 14. The controller of example 13, wherein the first control loop is configured to estimate the stator electrical angle and the stator flux magnitude by transforming the magnetic flux vector by an angle equal to the positive stator electrical angle plus the constant phase shift introduced by the first filter.

Example 15. The controller of example 13 or 14, wherein the first control loop is configured to transform the magnetic flux vector using a phase-locked loop.

Example 16. The controller of any of examples 13 through 15, wherein the first control loop is configured to estimate the load angle by subtracting the rotor electrical angle estimate from the stator electrical angle estimate.

Example 17. The controller of any of examples 13 through 16, wherein the first control loop is further configured to estimate motor torque from the stator flux magnitude estimate and quadrature axis components of a motor current vector.

Example 18. The controller of example 17, wherein the first control loop is configured to estimate the motor torque using a phase-locked loop.

Example 19. The controller of any of examples 13 through 18, further comprising a second control loop configured to implement motor torque control based on the rotor electrical angle estimate, the stator electrical angle estimate, the stator flux magnitude estimate, and the load angle estimate generated by the first control loop.

Example 20. The controller of example 19, wherein the second control loop is further configured to implement motor speed control based on the rotor electrical angle estimate.

Example 21. The controller of any of examples 1 through 20, wherein the first filter has a plurality of coefficients, and wherein the first control loop is configured to adjust one or more of the coefficients of the first filter based on the rotor electrical frequency estimate such that the constant phase shift introduced by the first filter remains independent of motor speed.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The expression "and/or" should be interpreted to include all possible conjunctive and disjunctive combinations, unless expressly noted otherwise. For example, the expression "A and/or B" should be interpreted to mean only A, only B, or both A and B. The expression "at least one of" should be interpreted in the same manner as "and/or", unless expressly noted otherwise. For example, the expression "at least one of A and B" should be interpreted to mean only A, only B, or both A and B.

It is to be understood that the features of the various embodiments described herein can be combined with each other, unless specifically noted otherwise.

Although specific embodiments have been illustrated and described herein, it will be appreciated by those of ordinary skill in the art that a variety of alternate and/or equivalent implementations can be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A controller for a permanent magnet synchronous motor, the controller comprising:
   a first control loop comprising a first filter,
   wherein the first filter has a back-EMF voltage vector input, a magnetic flux vector output with a constant phase shift that is independent of motor speed, and an amplitude response that is inversely proportional to rotor electrical frequency,
   wherein the first control loop is configured to:
      generate an adjusted magnetic flux vector from the magnetic flux vector output by the first filter and compensate for the constant phase shift introduced by the first filter;
      estimate the rotor electrical frequency from the adjusted magnetic flux vector; and
      feedback a filtered version of the rotor electrical frequency estimate to the first filter as an estimation of the rotor electrical frequency.

2. The controller of claim 1, wherein the first control loop is further configured to:
   generate the back-EMF voltage vector from an applied motor voltage vector and an applied motor current vector in a stationary reference frame;
   apply a phase shift to the applied current vector to generate a phase-shifted version of the applied current vector that has the same phase shift as the magnetic flux vector output by the first filter; and
   generate the adjusted magnetic flux vector from the magnetic flux vector output by the first filter and the phase-shifted version of the applied current vector.

3. The controller of claim 2, wherein the first control loop is configured to generate the adjusted magnetic flux vector by scaling the phase-shifted version of the applied current vector and subtracting the scaled and phase-shifted version of the applied current vector from the magnetic flux vector output by the first filter.

4. The controller of claim 2, wherein the first control loop is configured to apply a phase shift to the applied current vector by using a rotation matrix with fixed angle.

5. The controller of claim 1, wherein the first control loop is further configured to estimate rotor electrical angle from the adjusted magnetic flux vector.

6. The controller of claim 5, wherein the first control loop is configured to estimate the rotor electrical frequency from the adjusted magnetic flux vector by transforming the adjusted magnetic flux vector by the estimated rotor electrical angle plus the constant phase shift introduced by the first filter.

7. The controller of claim 6, wherein the first control loop is configured to transform the adjusted magnetic flux vector using a phase-locked loop.

8. The controller of claim 6, wherein the first control loop is further configured to generate an error vector from quadrature axis components of the transformed vector and a magnitude vector from direct axis components of the transformed vector.

9. The controller of claim 8, wherein the first control loop is further configured to estimate motor torque from the magnitude vector.

10. The controller of claim 9, wherein the first control loop is configured to estimate the motor torque using a phase-locked loop.

11. The controller of claim 5, wherein the controller is configured for rotor frame orientation (RFO) control and comprises a second control loop configured to implement motor current control based on the rotor electrical angle estimate generated by the first control loop.

12. The controller of claim 11, wherein the second control loop is further configured to implement motor speed control based on the rotor electrical frequency estimate generated by the first control loop.

13. The controller of claim 1, wherein the controller is configured for stator frame orientation (SFO) control, and wherein the first control loop is further configured to estimate each of rotor electrical angle, stator electrical angle, stator flux magnitude, and load angle from the magnetic flux vector output by the first filter and the adjusted magnetic flux vector.

14. The controller of claim 13, wherein the first control loop is configured to estimate the stator electrical angle and the stator flux magnitude by transforming the magnetic flux vector by an angle equal to the positive stator electrical angle plus the constant phase shift introduced by the first filter.

15. The controller of claim 13, wherein the first control loop is configured to transform the magnetic flux vector using a phase-locked loop.

16. The controller of claim 13, wherein the first control loop is configured to estimate the load angle by subtracting the rotor electrical angle estimate from the stator electrical angle estimate.

17. The controller of claim 13, wherein the first control loop is further configured to estimate motor torque from the stator flux magnitude estimate and quadrature axis components of a motor current vector.

18. The controller of claim 17, wherein the first control loop is configured to estimate the motor torque using a phase-locked loop.

19. The controller of claim 13, further comprising a second control loop configured to implement motor torque control based on the rotor electrical angle estimate, the stator electrical angle estimate, the stator flux magnitude estimate, and the load angle estimate generated by the first control loop.

20. The controller of claim 19, wherein the second control loop is further configured to implement motor speed control based on the rotor electrical angle estimate.

21. The controller of claim 1, wherein the first filter has a plurality of coefficients, and wherein the first control loop is configured to adjust one or more of the coefficients of the first filter based on the rotor electrical frequency estimate such that the constant phase shift introduced by the first filter remains independent of motor speed.

* * * * *